United States Patent [19]
Kettel

[11] Patent Number: 5,388,456
[45] Date of Patent: Feb. 14, 1995

[54] PROCEDURE IN ORDER TO DETECT THE GAS POTENTIAL IN SEDIMENTARY BASINS AND THE OIL POTENTIAL OBTAINED FROM THIS

[76] Inventor: Dirk Kettel, Rambergstrasse 33, D-3000 Hannover 1, Germany

[21] Appl. No.: 135,870

[22] Filed: Oct. 14, 1993

Related U.S. Application Data

[63] Continuation of Ser. No. 724,163, Jul. 1, 1991, abandoned.

[30] Foreign Application Priority Data

Jul. 5, 1990 [DE] Germany ............................ 4021465

[51] Int. Cl.$^6$ .................... G01V 5/02; G01N 37/00; G01N 33/00; G01N 33/22
[52] U.S. Cl. ............................. 73/152; 73/153; 166/250
[58] Field of Search ................. 73/151, 152, 153, 155; 166/250

[56] References Cited

U.S. PATENT DOCUMENTS

| | | | |
|---|---|---|---|
| 2,445,305 | 7/1948 | Hochgesang | 73/152 |
| 3,033,287 | 5/1962 | Bond | 166/250 |
| 3,239,666 | 3/1966 | Newton et al. | 73/155 |
| 4,340,391 | 7/1982 | Demaison et al. | 73/19.02 |
| 4,369,497 | 1/1983 | Poupon et al. | 73/152 |
| 4,773,264 | 9/1988 | Herron | 73/152 |

OTHER PUBLICATIONS

*Experimental Evidence Against an Appreciable Isotopic Fractionation of Methane During Migration*, A. N. Fuex, pp. 725–732.
*Geochemical Surface Exploration for Hydrocarbons in North Sea*, E. Faber & W. Stahl, "The American Association of Petroleum Geologists Bulletin", v. 68, No. 3, pp. 363–386.
*Use of Stable Carbon Isotope Compositions of Pyrolytically Derived Methane as Maturity Indices for Carbonaceous Materials*, H. Moses Chung & William M. Sacket, "Geochimica et Cosmochimica Acta", vol. 43, pp. 1979–1988, 1979.
"Physical and Geological Implications in Surface Geochemical Explorations", Bull. Swiss Assoc. of Petroleum Geol. & Eng., vol. 55, No. 129, Feb. 1990, pp. 27–40.

*Primary Examiner*—Hezron E. Williams
*Assistant Examiner*—George M. Dombroske
*Attorney, Agent, or Firm*—Shlesinger Arkwright & Garvey

[57] ABSTRACT

Thermocatalytically generated gaseous hydrocarbons from gas or oil prone source rocks in subsiding sedimentary basins and those penetrating the seal of gas or oil accumulations at the surface reach the surface in geologically short times and in low concentrations. These transported hydrocarbon gases transmit information to the surface concerning hydrocarbon potential, organic facies and maturity of the generating source rock and characteristics of the gas accumulation. In the present invention, these near surface gaseous traces are analyzed according to their molecular and isotopic composition, and from that information the status of gas and oil generation is derived by analyzing the compositional shifts of the gas due to migration. The shifts in isotopic composition of methane gas during migration are quantified. Relationships of the original gas parameters are reconstructed in this way to derive information as to the geological status and potential of their source i.e. the prospectivity of the basin. The hydrocarbon potential available to the filling of a discrete structure, or regionally to a sedimentary basin, and its lateral variations can now be assessed prior to drilling. Under special conditions, hydrocarbon accumulations in the subsurface can be directly detected as well as lateral variations in the effectivity of seals. The method presented here can effectively reduce the risk in the exploration for oil and gas.

4 Claims, 9 Drawing Sheets

5,388,456

PROCEDURE IN ORDER TO DETECT THE GAS POTENTIAL IN SEDIMENTARY BASINS AND THE OIL POTENTIAL OBTAINED FROM THIS

This application is a continuation of application Ser. No. 07/724,163, filed Jul. 1, 1991, now abandoned.

FIELD OF THE INVENTION

The aim of applying surface geochemical techniques for the exploration of oil and gas is to detect productive source rocks and/or the hydrocarbon fill of seismically identified subsurface structures by sampling near-surface sediments and analyzing the hydrocarbon content. A hydrocarbon source within the meaning of the present invention includes any of a variety of subsurface hydrocarbon field structures whether they be petroleum accumulations or a specific type of source rock.

The sampling and analytical method according to the present invention includes measuring $C_1$ through $C_6$ hydrocarbon traces absorbed within clayey fraction $<63$ μm of the surface sediment. The resultant geochemical gas parameters obtained are the gas yields of $C_1$ through $C_6$ in weight-ppbs per sample weight, and the stable isotope compositions $\delta^{13}C_1$ and $\delta DC_1$ of methane within the sample. Theory implies that the isotopic composition of a gas may be indicative for the maturity and the organic facies at its source, while the gas yields may hopefully be indicative for the gas potential in the subsurface. Stahl, W. J., Carey, B. D., 1975, "Source rock identification by isotope analyses of natural gases from fields in the Val Verde and Delaware Basins, West Texas", Chemical Geology, vol. 16, p. 257–267; Schoell, M., 1984 a, Stable Isotopes in Petroleum Research", Advances in Petroleum Geochemistry London (Brooks, J. and Welte, D. Eds.), p. 215–245; Kettel, D., 1989 "Upper Carboniferous source rocks north and south of the Variscan Front (NW and Central Europe)", Marine and Petroleum Geology, vol. 6, no. 2, p. 170–181 and Clayton, C., 1991 "Carbon isotope fractionation during natural gas generation from kerogen", Marine and Petroleum Geology, vol. 8, no 2, p 232–240. Geochemical surveys worldwide demonstrate that this is generally not the case. Stahl, W. J., Kelch, H. J., Getling, P., Faber E., 1984 "Gasförmige Kohlenwasserstoffe in Oberflächensedimenten des Elm", Geologisches Jahrbuch, A, vol. 75, p. 501–524, Faber, E. Stahl, W. J., 1984, "Geochemical Surface Exploration for Hydrocarbons in North Sea", AAPG Bull., vol. 68, no. 3, p. 363–386 and Fuex, A. N., 1980 "Experimental evidence against an appreciable isotopic fractionation of methane during migration", Advances in Organic Geochemistry 1979 (Douglas, A. G. and Maxwell, J. R., Eds.), p. 725–732.

Migration from the source rock to an accumulation does not reasonably fractionate isotopically because of the high methane concentrations accumulating. Thus, correlations from the isotopic compositions of reservoired methane to the maturity and organic facies of their sources have been proven as valid. However, this does not apply for gases migrating from the source rock or an accumulation toward the surface since the gas concentration migrating has a low concentration and reasonable isotopic fractionations does occur. This is observable not only in the free gas phase (Fuex 1980), but also in the adsorbed gas phase.

BRIEF DESCRIPTION OF THE DRAWINGS

FIG. 10 illustrates the relationship between the measured isotopic ratio and the yields of adsorbed methane for the same source and the same sample lithology.

FIG. 11 illustrates isotopic shift as a function of factor A and methane yield $x_{sn}$.

BACKGROUND OF THE INVENTION

Figure 1:
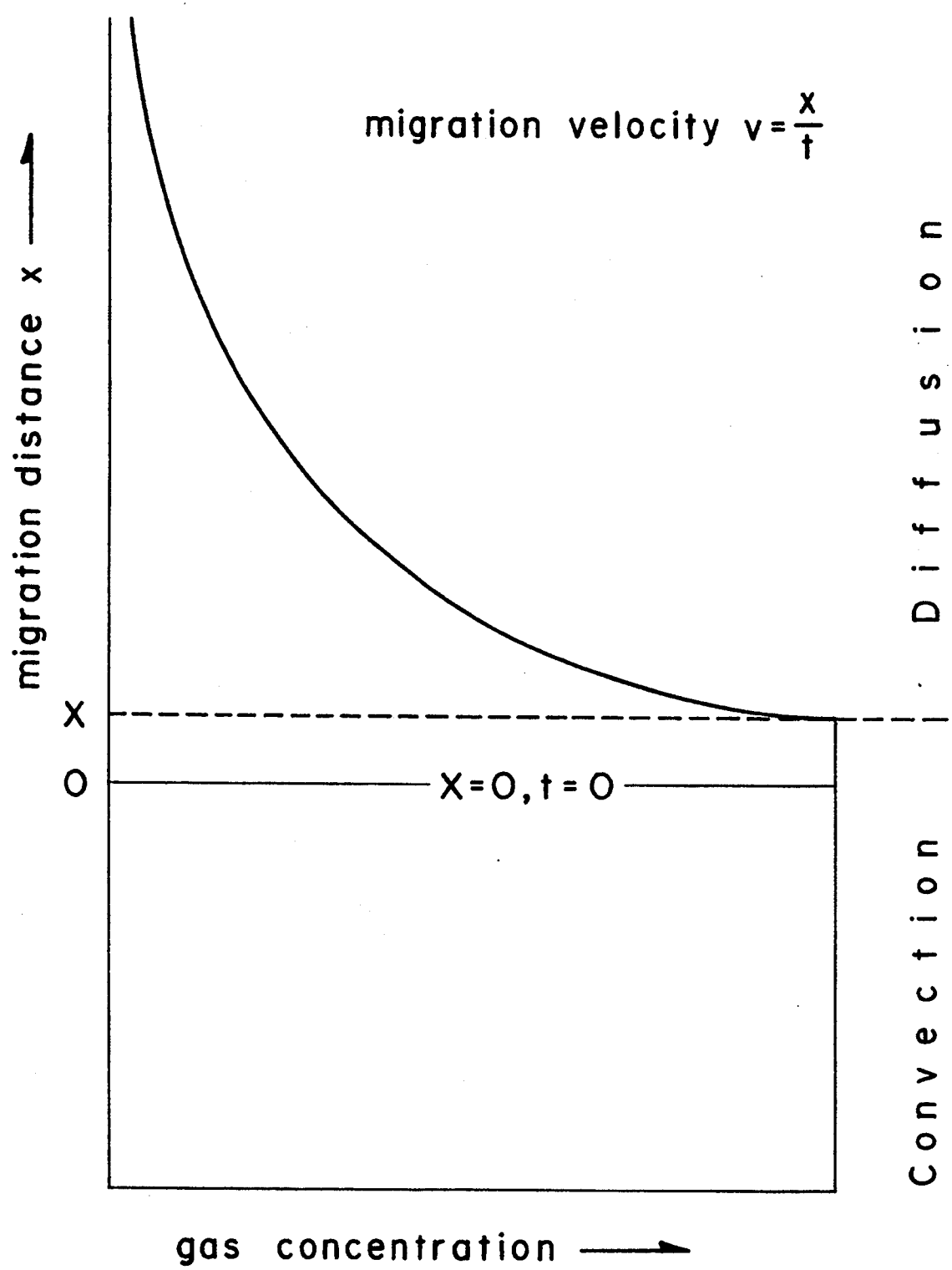
FIG. 1 illustrates a pre-stationary gas concentration profile within a near-surface sediment due to water transport.

It has become evident from isotopic measurements at free and adsorbed gases in deep or shallow wells that for the same site, which means for the same subsurface gas potential and the same source rock properties, the isotopic compositions of methane and heavier gases vary with the lithology of the sampled sediment. Lommerzheim, A., 1988, "Die Genese und Migration von Kohlenwasserstoffen im Münsterländer Becken", Dissertation, Universität Münster and Stahl, W. J., Kelch, H. J., Gerling, P., Faber E., 1984 "Gasförmige Kohlenwasserstoffe in Oberflächensedimenten des Elm", Geologisches Jahrbuch, A, vol. 75, p. 501–524. Applicant has discovered that the dominant lithologic parameter influencing this isotopic fractionation of the gases is permeability of the sample. Permeability means fluid flow through porous media, and thus gives some insight upon the mechanism of gas migration through porous media and the compositional fractionation of gases on their way from the source rock or the reservoir toward the surface.

Sediments are subdivided in porous and dense media. In porous and permeable media, pre-steady-state concentration profiles measured in nature (FIG. 1) imply that a mobile or carrier medium (water) acts as a transporting agent for a solute (gas), which is left somewhat behind the solvent front due to adsorption-desorption processes at the surface of a solid adsorbent (clay). In other words, the physical process of gas migration through porous media is water convection modified by diffusion of the soluted gas in water.

Any fractionations of the isotopic gas compositions during this process can now be quantified and described using mass balance for the lighter and the heavier isotopes, the definition of the δ-values, and an appropriate equilibrium fractionation factor $\alpha$ for the transition gas from solution to adsorbed gas.

The velocity of water convection can appropriately be described by DARCY's law when the permeabilities of the rocks penetrated are greater than $10^{-3}$ darcy, because experience with the method presented here shows that for this range of permeabilities, linearity of DARCY's law is given. This does not apply for permeabilities smaller than $10^{-3}$ darcy, because the same experience suggests non-linearity within this range. The same results would be given for different ranges in pressure gradient i, along which convection occurs. Gabener, H. G., 1983 "Untersuchungen über die Anfangsgradienten und Filtergesetze bei bindigen Böden" Mitteilungen aus dem Fachgebiet Grundbau und Bodenmechanik Univ. Essen, vol. 6. Non-linearity is mainly caused by surface-related interactions between the solvent (water) and the solid adsorbent (clay) (Knudsen flow).

Gas migration through dense media (salt, anhydrite) can be described by diffusion through rock matrix or liquids (fluid inclusions), sometimes combined with starting convection (fissure). To a large extent, all these processes can be handled by FICK's law of diffusion. The resulting velocities depend on the heterogeneities of the media, and on the diffusion constants of the different gas/matrix system involved. Krooss, B. M. Leythaeuser, D., 1988 "Experimental measurements of the diffusion parameters of light hydrocarbons in water-saturated sedimentary rocks. Results and geochemical significance", Organic Geochemistry, vol. 12, no 2, p. 91–108; Moisio Thomas, M., 1989 "Comments on Calculation of Diffusion Coefficients from Hydrocarbon Concentration Profiles in Rocks", AAPG Bull, vol. 73, no. 6, p. 787–791; Sahores, J. J., Witherspoon, P. A., 1970 "Diffusion of light paraffin hydrocarbons in water from 2° C. to 80° C.", Advances in Organic Geochemistry 1966 (Hobson, G. D. and Speers G. C. Eds.), p. 219–230. They are smaller at least by the factor $10^4$ than convectional velocities.

This evidence is important for the present method when dense layers inhibit rapid gas transport or information transfer from a source rock or an accumulation toward the surface. Thus, during the same migration time, only a small portion of the initial gas concentration reaching the top of the dense layer is available to further convectional transport and detection at the surface. The initial potential below the dense layer can then be calculated by diffusion modelling, using the gas potential at the top of the layer, thickness and diffusion constant of the layer, migration time and pT-regime. This also implies the possibility to evaluate lateral variations in seal effectivity by the present method, when the initial gas potentials below the seal are laterally constant or known.

As noted above, methane in solution is carried by convectional water flow through porous sediments. During this process, partial separation occurs from the dissolved phase into a free gas phase and into an adsorbed phase. Both phase transitions are partly compensated by solution or desorption, and thus reach an equilibrium with a few hours or days in laboratory set-ups.

Phase transitions of methane and heavier gases go along with isotopic fractionations, as observed in both nature and laboratory. These are characterized by a fractionation factor $\alpha$ between the heavier and the lighter isotope.

As movement along the migration path from deep sources towards the surface, part of the methane leaves the system due to adsorption at the clayey particles. Theoretically, a continuous change in the isotopic composition of the dissolved methane occurs during this upward migration. In practice however, the relationship of adsorbed to transported methane in the system is so small that the dissolved methane practically does not change its isotopic composition during migration. This is the reason why the potential and the properties of a deep-seated gas source can be determined by analyzing a surface sediment or a bore hole sample regardless of the migration path the gas information followed. In terms of predicting gas potential, only the last phase transition (within the sediment sampled) is crucial.

DETAILED DESCRIPTION OF THE PREFERRED EMBODIMENTS

Isotopic fractionation due to phase transitions can be examined theoretically and calibrated in situ from observations in nature as in Fuex, (1980) where a formula, linking up methane concentration in the free phase $x_{gn}$, isotopic shift F and a factor k was presented. Using laboratory measurements of these three parameters, he determined the fractionation factor ($\alpha$) for the transition of dissolved methane into free methane and for the stable carbon isotope composition $\delta^{13}C_1$. In the following equations 1 through 7 and equation 9 are abstraction from Fuex (1980), while the deductions of equations 8 and 10 through 15 are newly developed for the present method in order to more precisely determine the actual isotopic shift F. Definitions and their derivates:

$$x_{gi} = {}^{12}C_{gi}/{}^{12}C_o$$

is the mole fraction of $12C_o$ in the gas phase after the ith step.

$$x_{ai} = 12C_{ai}/12C_o$$

is the mole fraction of $12C_o$ in the dissolved phase after the ith step except the gas dissolved during the previous i-1th step.

$$\delta = \left( \frac{R_{probe}}{R_{standard}} - 1 \right) \times 1000 \, [\%] \quad (1)$$

is the definition of the isotopic composition, where $$R_{probe} \; {}^{13}C/{}^{12}C \text{ resp. } D/H \text{ of the methane} \quad (2)$$

$$R_{standard} \; {}^{13}C/{}^{12}C \text{ resp. } D/H \text{ of the standard}$$

$$k = x_{gi}/x_{ai}$$

is a constant dependent on purely geological parameters $$k = {}^{12}C_{gi}/{}^{12}C_{ai} \text{ resp. } H_{gi}/H_{ai} \quad (3)$$

$$\alpha = R_{as}/R_{gi} \quad (4)$$

is the definition of the fractionation factor. Therefore from (1) and (4) follows:

$$\alpha = \frac{\delta_{ai} + 1000}{\delta_{gi} + 1000} \quad (5)$$

The mass balance used for $^{13}C$:

$$^{13}C_{gi-1} = {}^{13}C_{ai} + {}^{13}C_{gi} \quad (6)$$

The mass balance used for 12C:

$$^{12}C_{gi-1} = {^{12}C_{ai}} + {^{12}C_{gi}} \quad (7)$$

or equally applied to D and H.

By mutual substitution of equations (1) through (7) the isotopic shift $\delta_{gi}$ of the free methane after the ith step becomes:

$$\text{delta } \delta_{gi} = \text{delta } \delta_{g1} \times \frac{\left(\frac{1+k}{\alpha+k}\right)^2 - 1}{\frac{1-\alpha}{\alpha+k}} \quad (8)$$

By the same procedure $\delta_{g1}$ of the first step becomes:

$$\text{delta } \delta_{g1} = \frac{1000(1-\alpha)}{\alpha+k} \quad (9)$$

Therefore from (8) and (9):

$$\text{delta } \delta_{gi} = \frac{1000(1-\alpha)}{\alpha+k} \times \frac{\left(\frac{1+k}{\alpha+k}\right)^2 - 1}{\frac{1-\alpha}{\alpha+k}} \quad (10)$$

$$\text{delta } \delta_{gi} = 1000 \times \left(\left(\frac{1+k}{\alpha+k}\right)^2 - 1\right)$$

when delta $\delta_{gn}$ is the sum of isotopic shifts after complete fractionation during n steps (i=n):

$$\text{delta } \delta_{gn} = F \quad (11)$$

From (10) and (11):

$$F = 1000 \times \left(\left(\frac{1+k}{\alpha+k}\right)^n - 1\right) \quad (12)$$

$$\frac{F}{1000} + 1 = \left(\frac{1+k}{\alpha+k}\right)^n$$

$$\ln\left(\frac{F+1000}{1000}\right) = n \times \ln\left(\frac{1+k}{\alpha+k}\right)$$

$$n = \frac{\ln\left(\frac{F+1000}{1000}\right)}{\ln\left(\frac{1+k}{\alpha+k}\right)}$$

The methane concentration in the gas phase $x_{gn}$ after n steps is:

$$x_{gn} = \left(\frac{1+k^{-n}}{k}\right) = \exp -\left[n \times \ln\frac{1+k}{k}\right] \quad (14)$$

and from (13) and (14)

$$x_{gn} = \exp -\left[\frac{\ln\left(\frac{1+k}{k}\right)}{\ln\left(\frac{1+k}{\alpha+k}\right)} \times \ln\left(\frac{F+1000}{1000}\right)\right] \quad (15)$$

In the following, phase transitions from dissolved methane into adsorbed methane will be handled by this equation. Therefore factor k will be substituted by factor A and $x_{gi}$ by $x_{sn}$, which stands for adsorption:

$$x_{sn} = \exp -\left[\frac{\ln\left(\frac{1+A}{A}\right)}{\ln\left(\frac{1+A}{\alpha+k}\right)} \times \ln\left(\frac{F+1000}{1000}\right)\right] \quad (16)$$

Figure 2:
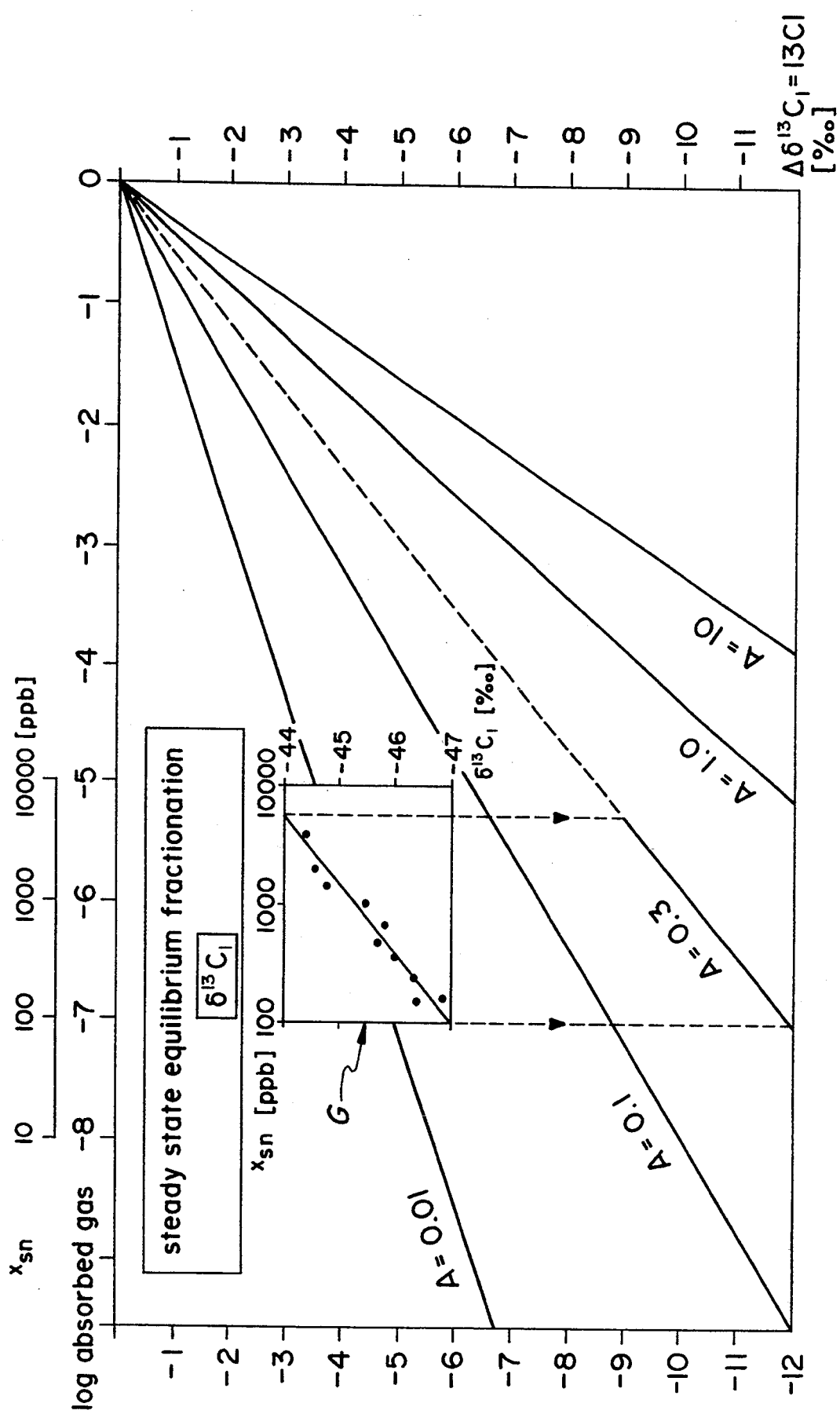
FIG. 2 illustrates fractionation between the stable carbon isotopes of methane for the transition from dissolved phase into the adsorbed phase.

Equation (16) thus expresses the mass balance and theoretical relationships between the methane concentration of the adsorbed phase $x_{sn}$, the isotopic shift F which the adsorbed phase suffers after reaching equilibrium conditions, the fractionation factor a of methane between the heavier and the lighter isotopes during absorption, and a geological factor A. The fractionation factors $\alpha$ for 13C/12C and D/H for adsorbed methane will be determined below, using case histories and equation 16. Of the remaining three parameters $x_{sn}$, F and A, each one can be determined when the other two are known. This calculation can also be shown graphically as illustrated in FIG. 2 for $\delta^{13}C_1$ and in FIG. 3 for $\delta DC_1$ which is essentially equation 16 employing a known $\alpha$.

In order to determine the fractionation factor $\alpha$ between $^{13}C$ and $^{12}C$ for the transition of dissolved methane into adsorbed methane, data sets from the wells Herbern 45/45E1 and Wulfen 6 (Münsterland, Germany, Lommerzheim 1988) have been used. In these wells, the yields of adsorbed methane $x_{sn}$ and their isotopic composition $\delta^{13}C_1$ and $\delta DC_1$ have been measured throughout the Upper Cretaceous section. These case histories reveal the special situation that permeability all over the section remains relatively constant. This is reflected by the $\delta$- values which show a very small scattering. Nevertheless measured gas parameters show an upward trend gas yield $x_{sn}$ diminishes by the factor 3 and the isotopic shift F ($\delta^{13}C_1$) increases by factor 2. As illustrated in FIG. 2, such trends can only be related to changes in factor A.

For the calculation of Factor A all parameters except the sample temperature T and the dynamic viscosity of water $\mu$ as a function of T are constant throughout. The migration distance of the gas $h_2$ is negligible according to equation 25. The constant parameters are known, and especially as applicable to the local source rock potential, the original gas signature and the local pressure gradient. The values of the variables T and $\mu$ are calculated as a function of sample depth, using a thermal gradient of 4.45° Celsius/100 m for the well Herbern 45/45E1 and 2.92° Celsius for the well Wulfen 6. See Matthess, G., 1973 "Lehrbuch der Hydrogeologie, Band 2", Borntraeger Berlin, Stuttgart and Lommerzheim, 1988. Once the factors A have been calculated for all data sets according to equation 25, the methane yield $x_{sn}$, isotopic shift F and factor A for each sample enables one to determine the fractionation factor $\alpha$ for $^{13}C/^{12}C$ of methane, transforming equation 16 by the following regression approach:

$$\ln x_{sn} = \frac{\ln\left(\frac{1+A}{A}\right)}{\ln\left(\frac{1+A}{\alpha+A}\right)} \times \ln\left(\frac{F+1000}{1000}\right) \quad (17)$$

$$[\ln(1+A) - \ln(\alpha+A)]\ln x_{sn} =$$

$$-\ln\left(\frac{1+A}{A}\right) \times \ln\left(\frac{F+1000}{1000}\right)$$

$$\ln x_{sn} \times \ln(\alpha + A) = \ln\left(\frac{1+A}{A}\right) \times$$

$$\ln\left(\frac{F+1000}{1000}\right) + \ln x_{sn} \times \ln(1+A)$$

$$\ln(\alpha + A) = \frac{1}{\ln x_{sn}} \times \ln\left(\frac{1+A}{A}\right) \times$$

$$\ln\left(\frac{F+1000}{1000}\right) + \ln(1+A)$$

$$\frac{\ln\frac{F+1000}{1000}}{\ln x_{sn}}$$

$$\alpha + A = (1+A)\left(\frac{1+A}{A}\right)^{\frac{\ln\frac{F+1000}{1000}}{\ln x_{sn}}}$$

$$\alpha = -A + (1+A)\left[\left(\frac{1+A}{A}\right)\right]$$

The fractionation factor $\alpha$ calculated from the data sets of the Herbern and Wulfen wells via equation (17) between $^{13}C$ and $^{12}C$ for the transition of dissolved methane into adsorbed methane is:

$$\alpha_{13C1/12C1} = 1.0014493$$

Equation (16) using $\alpha_{13C1/12C1}$ is also shown graphically in FIG. 2.

The above procedure and the above case histories have also been applied in order to determine fractionation factor $\alpha$ for D/H of methane, substituting F by $FD_{C1}$. The calculated value for $\alpha$ D/H for the transition of dissolved into adsorbed methane is:

$$\alpha_{DC1/HC1} = 0.9752528$$

Figure 3:
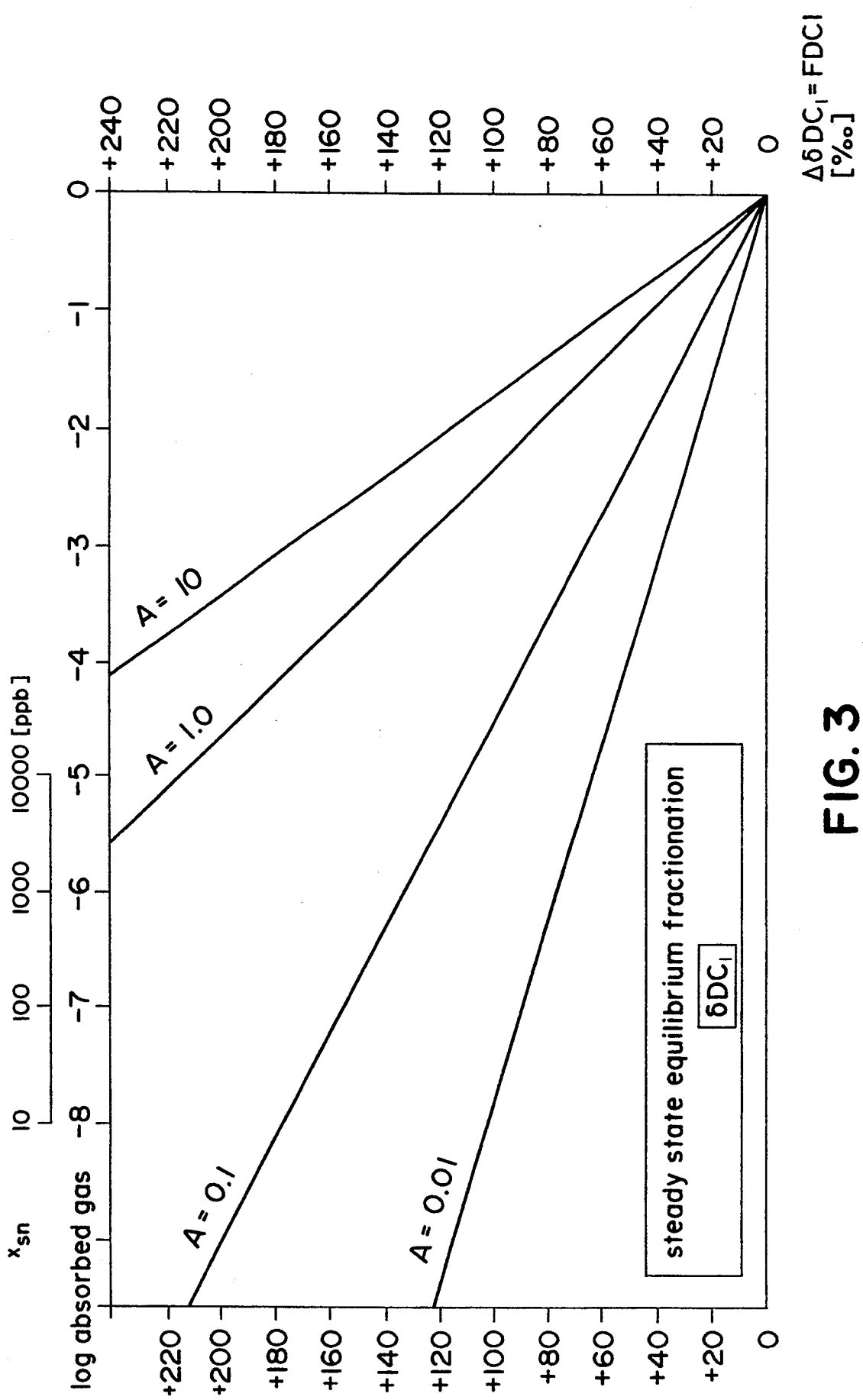
FIG. 3 illustrates fractionation between the hydrogen isotopes of methane for the transition from dissolved phase into the adsorbed phase.

Equation 16 using $\alpha_{DC1/HC1}$ is also shown graphically in FIG. 3.

Comparing $\alpha_{DC1/HC1}$ to $\alpha_{13C1/12C1}$ indicates that:
(1) fractionation of $\delta DC_1$ is stronger than of $\delta 13C_1$ by a factor of 18. This is in qualitative agreement with experience from other fractionation processes delta $\delta DC_1$/delta $\delta^{13}C_1$ in nature, as well as from dissolution experiments by Gunter, B. D., Gleason, J. D., 1971, "Isotope fractionation during gas chromatographic separations" J. of Chromatographic Science, vol. 9, p. 191-192; Gant, P. L., Yang, K., 1964, "Chromatographic separation of isotopic methanes" J. Am. Chem. Soc., vol. 86, p. 5063-5064 and Fuex (1980).

(2) $\delta DC_1$ fractionates towards the more positive whereas $\delta^{13}C_1$ fractionates towards the more negative. This also is in agreement with laboratory observations. See Fuex, 1980.

In spite of markedly lower yields of $C_2$ and $C_3$ gases in surface sediments than those of methane, the respective $\delta^{13}C_2$ and $\delta^{13}C_3$ values can also be measured today in laboratory set-ups. In adsorbed gases over a dry, humic gas source, $C_2$-yields in the range of 0.3 of the methane yields can normally be observed. This relationship results from a lower $C_2$-supply from the gas source in combination with a higher adsorptivity of $C_2$ at the clayey fraction than of methane.

According to equation 25, the product of gas supply and adsorptivity determines the value of factor A when the other parameters are constant. In the case histories mentioned above, factor A for $C_2$ is 0.3 of factor A for $C_1$. When factor A becomes smaller it means according to equation 17, that the isotopic shift F diminishes also. In fact, it can be observed in case histories that fractionation of $C_2$ and $C_3$ is smaller than that of $C_1$. But nevertheless, reasonable fractionation occurs compared with the interpretation range of original $\delta^{13}C_{2\text{-}3}$.

Experience with the method presented here indicates that fractionation of $C_2$ and $C_3$ obey the same laws as set forth in equation 17 and 25 for methane if appropriate fractionation factors $\alpha$ are established from case history data. But according to James, A. T., 1990, "Correlation of Reservoired Gases Using the Carbon Isotopic Compositions of Wet Gas Components" AAPG Bull, vol. 74, no. 9, p. 1441-1458 the $\delta$-values of reservoired $C_2$ and $C_3$ are strongly maturity-related and poorly facies-related. This would reduce the interpretation possibilities of a method based on $C_2$ and $C_3$. Hence the present method uses fractionation of methane gas.

Considering the phase transition of dissolved methane into adsorbed methane, equation 3 gives factor A after the ith step:

$$A = {}^{12}C_{si}/{}^{12}C_{aibzw}.H_{si}/H_{ai} \quad (18)$$

A equals the relationship of the light isotopes 12C or H respectively for the gas in the adsorbed phase to that in dissolved phase. This means that A is a function of the adsorptivity q of the light gas at the clayey surfaces, the relationship of gas to water supply to the sampled sediment over the time, and of the solubility $\cap$ of the light gas in water of a certain salinity and under near-surface pt-conditions.

$$A = \frac{\cap \times q \times \text{gas supply}}{\text{water supply}} \quad (19)$$

For a discrete time slice during gas generation from a source rock and upward migration of water A is best expressed as:

$$A = \frac{\cap \left[\frac{cm^3 CH_4}{cm^3 H_2O}\right] \times q \left[\frac{cm^3 CH_4}{cm^3 Ton}\right] \times \text{delta} G \left[\frac{Cm^3 CH_4}{gTOC \times 0.1\% R}\right] \times TOC[\%] \times F[m^2] \times h_1[m] \times \Gamma \left[\frac{g}{cm^3}\right]}{F[m^2] \times h_2[m] \times \Phi[\%]} \quad (20)$$

By integration over the time, the term "gas supply" has to be regarded as gas generation during maturity increments $R_o/t$ [% year], the term "water supply" as water flux through the sedimentary column in time t. According to DARCY, the water volume Q, which passes area F in 1 sec., is a function of the hydraulic pressure gradient i [m/m] and a permeability constant $k_f$ [m/sec]:

$$\frac{Q}{F} = v = k_f \times i \quad (21)$$

v is called "filtering velocity" in [m/sec]. $k_f$ is substituted by the permeability K [darcy=$10^{-5}$ m/sec], and i [m/m] is substituted by i [bar/m=10 m/m].

This linear form of DARCY's law is only valid within the range of high pressure gradients and high permeabilities. See Gabener, 1983. Below threshold values of both parameters, changes in filtering velocity with decreasing K or i become increasingly smaller, approaching zero with K and i. This dependency has been described by Gabener (1983) as a set of functions v=f(K, i), where for each K one function v=f(i) is given, which is expressed as a parabolic curve merging into linearity for higher values of i.

This experience has been confirmed by applying the present method of surface exploration. In addition, the threshold values $K_0$ and $i_0$ could be estimated. $K_0$ is given as approximately $10^{-3}$ darcy, and herewith the present method of analyzing surface sediments generally operates within the transition zone curvation/linearity of the function v=f(k). $i_0$ is approximately 1 [bar/m], and therefore the present method operates within the curved range of v=f(i).

The non-linearity of DARCY's law v=f(K, i) is expressed for the present method not as a set of functions, but as one function v=f(K), which only works precisely for a narrow range of i-values and from experience is approximately 0.01 [bar/m]. Interpretation work on the present method suggests that curved range of v=f(K) will not be modelled as a parabolic function because such strong curvation produces lithology dependencies of the interpretation results. The model chosen according to the present method is a hyperbolic function, that asymptotically approaches a linear function. An additional advantage of this function is that it is independent from dimensions of K and i:

$$v = i \times (\sqrt{K_0^2 + K^2}) - K_0) \quad (22)$$

where $K_o = 10^{-3}$ [darcy], and where the function is only valid within a narrow range around i=0.01 [bar/m], because of $K_0$=f(i).

The driving force for the water movement is the vertically upward oriented excess pressure gradient i over the time t. According to Magara, K., 1987 "Fluid flow due to sediment loading—an application to the Arabian Gulf region", Fluid Flow in Sedimentary Basins and Aquifers, Goff, J. C. and Williams, B. P. J. (Eds.), Geological Society London Special Publication no. 34, p. 19–28, pressure history could be obtained from the compaction history (hydraulic pressure) and additionally from the temperature history (aquathermal pressure, Magara, K., 1975, "Importance of Aquathermal Pressuring Effect in Gulf Coast", AAPG Bull, vol. 59, no. 10, p. 2037–2045).

In view of the above, from equation 20 one therefore obtains:

$$A = \frac{\cap \times q \times \text{delta } G \times TOC \times h_1 \times \Gamma \times 10 \text{ delta } R_0}{(\Phi \times h_2) + \left(\frac{i \times (\sqrt{K_0^2 + K^2}) - K_0) \times 3.1 \times 10^2 \times t}{\mu}\right)} \quad (23)$$

where $\mu$ is the dynamic viscosity of water [centipoise] at temperature T [° Celsius].

The adsorptivity q of methane at the clayey fraction is a function of temperature. Adamson, A. W., "Physical chemistry of surfaces" Interscience Publishers New York, London, Sydney (1967). Landolt and Börstein in 1956 published (Landolt and Börnstein, 1956, "Zahlenwerte und Funktionen aus Physik, Chemie etc., Band 2,3 Teil", Springer-Verlag Berline, Göttingen, Heidelberg) a data set for the adsorption of methane in charcoal, from which the following function between the parameters q and temperature T, q at temperature 10° Celsius and T can be derived:

$$q(T) = q_{10°\ C.} \times \pi \times \frac{1}{\sqrt{T}} \quad (24)$$

For an easier handling of equation 23 under near-surface conditions, q(t) is substituted by $q_{10°\ C.}$ and T:

$$A = \frac{\cap \times \pi \times q_{10°\ C.} \times \text{delta } G \times TOC \times h_1 \times \Gamma \times 10 \text{ delta } R_0}{\sqrt{T}\left[(\Phi \times h_2) + \left(\frac{i \times (\sqrt{K_0^2 + K^2}) - K_0) \times 3.1 \times 10^2 \times t}{\mu}\right)\right]} \quad (25)$$

where
delta G = differential gas generation ($cm^3$/g TOC×0.1% $R_0$)
TOC = organic carbon content (%)
$\Gamma$ = source rock density (g/$cm^3$)
HI = source rock thickness (m)
delta $R_0$ = maturity increment during time t (%)
q = adsorptivity methane/clay at 10° C. temperature ($cm^3$/$cm^3$)
$\cap$ = solubility methane in water under surface conditions ($cm^3$/$cm^3$)
$\mu$ = dynamic viscosity of water at temperature T (cp)
K = permeability of the sample (Darcy)
$\Phi$ = effective porosity of the sample (%)
t = time available to the gas migration (years)
$h_2$ = migration distance of the gas (m)
T = sample temperature (° Celsius)

$K_0$ = threshold value of K for the transition non-linearity/linearity of Darcy's law i = upwards directed excess pressure gradient (bar/m) over time t.

All the above geological parameters govern factor A as expressed by equation 25 including the methane yields $x_{sn}$ at the surface and the isotopic shifts F as expressed by the equations 25 and 16. Because of the fact that the measured parameters $x_{sn}$ and isotopic compositions δ reflect adsorption/desorption processes within the sampled near-surface sediment, the petrophysical parameters $q_{10°\,C}$, T, Φ, K and μ have to be taken as those of the near-surface sample. The end result is that the gas potential of a source rock or an accumulation in the subsurface, which is essentially:

$$\text{delta } G \times TOC \times h_1 \times \Gamma \times 10 \text{delta } R_0 (m^3/m^2 \text{ surface area}),$$

its original δ-values and near-surface parameters δ-values of the adsorbed methane i.e. the degree of isotopic fractionation or shift, the methane yield of the sample and the petrophysical properties of the sampled sediment depend upon each other. Therefore in order to determine the gas potential, in addition to these three near-surface parameters, the original/actual δ-values (which indicates maturity and organic facies of the source rock), must be known or vice versa.

Figure 4:
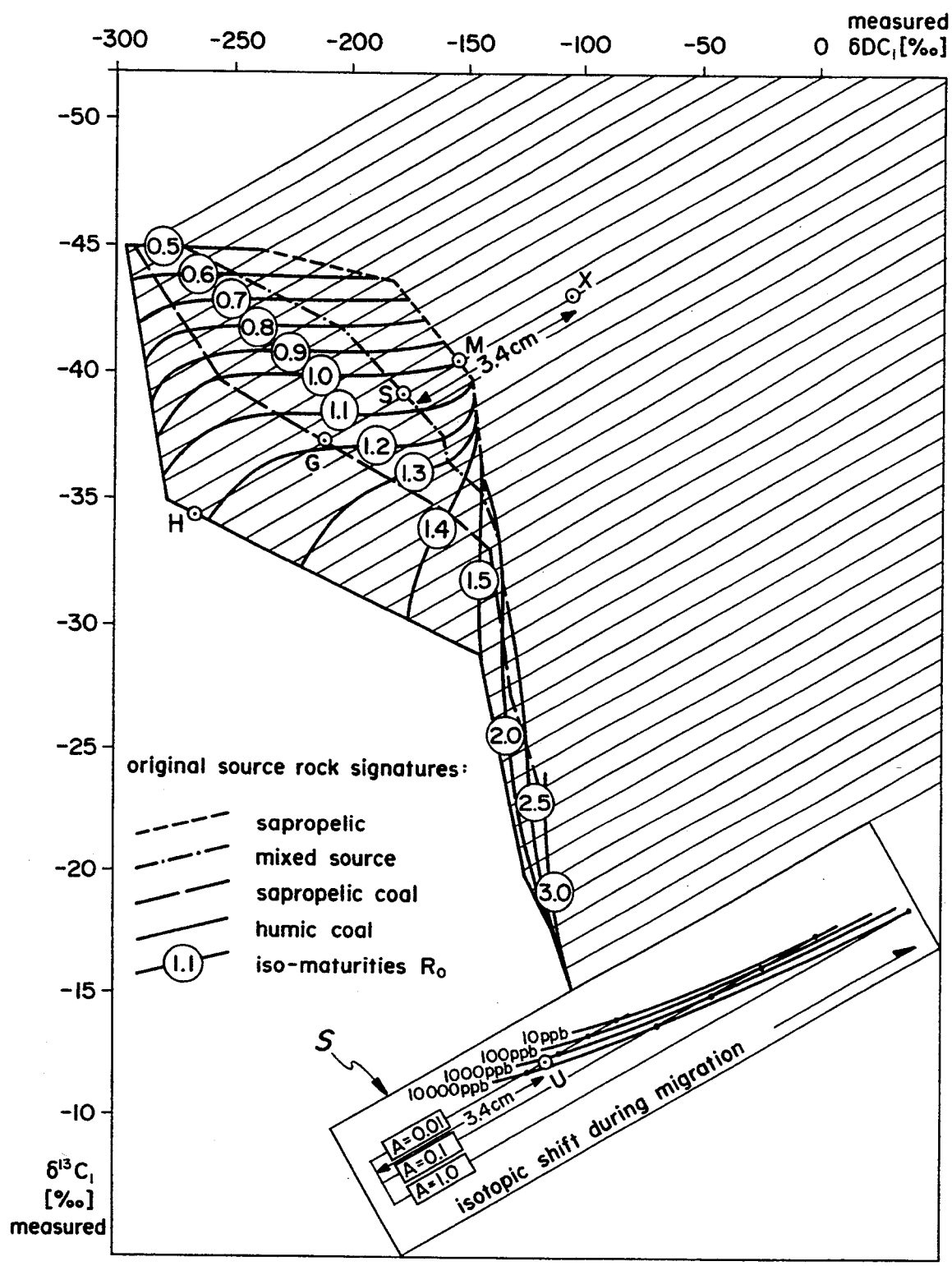
FIG. 4 illustrates differential diagnosis of the measured pair of $\delta^{13}C_1/\delta DC_1$.

The objective of the method presented here is to determine from each of the above three parameters, the hydrocarbon potential, maturity and organic facies of the source rock from near-surface measurements. This is achieved by the following procedure:

The calculations as set forth in equations 25 and 16 will be carried out for two separate isotopic compositions $\delta^{13}C_1$ and $\delta DC_1$ each of which fractionate in opposite directions as noted above. This increases the number of equations for the three unknown variables, FIG. 4 shows the improved graphical interpretation procedure using both δ-values. It is a combination of FIGS. 2, 3, 5 and 6. The measured $^{13}C_1$ and $\delta DC_1$ values are plotted on both axis. The field thus defined show the spurs of pairs of original δ-values occurring in natural accumulations indicative for different organic facies and maturities according to FIGS. 5 and 6. The set of parallel lines which runs towards the more negative $\delta^{13}C_1$ and towards the more positive $\delta DC_1$, is essentially the relationship of the fractionation equation 16 applied to (FIG. 2) and to $\delta DC_1$ (FIG. 3). In other words, the isotopic shift F of original δ-pairs due to fractionation runs strictly parallel to those lines. As indicated in FIG. 11, the distance of shift along these lines is a function of factor A and the measured methane yield. Thus, a measured δ-pair can be plotted in the field of the graph and then "shifted back" parallel to the lines until it meets different facies/maturity options. In order to discriminate one source rock option, facies or maturity or the distance of backshifting (which equals A) $x_{sn}$ must be known.

In the general case (FIG. 2), where neither facies nor maturity of the source rock are known, factor A can be determinedly by correlating data from the same survey. The measured δ-values are plotted against the relative methane yields for gases from the same source (at the same site) and from samples having the same permeability. Theoretically, the relationship of the gas yields reflects the relationships of the specific surface areas of the samples. The resultant functionality of the plotted data can be compared with FIGS. 2 or 3 respectively, and thus factor A can be determined (FIG. 10). This procedure requires multiple sampling within the same sediment at the same site (borehole) which may be repeated whenever source rock properties are suggested to change.

Once the original pair $\delta^{13}C_1/\delta DC_1$ of the source has been determined by the interpretation procedure previously described, the question arises as to how indicative the δ-values are to geological properties of their source.

It is well established from empirical correlations (Stahl 1975, Faber 1987 and Kettel 1989), from pyrolysis experiments (Chung, H. M. and Sackett, W. M., 1979 "Use of stable carbon isotope compositions of pyrolytically derived methane as maturity indices for carbonaceous materials", Geochimica et Cosmochimica Acta, vol. 43, p. 1979-1988) as well as by theoretical considerations (Clayton, 1991) that the $\delta^{13}C_1$ of reservoired gas is a function of the maturity and the organic facies of the generating source rock. The link between generated and reservoired gas is valid because there does not occur major fractionation between the methane expelled and the methane reservoired. Fuex (1980). General characteristics of this functionality are that with increasing maturation of the parent material, the methane generated becomes heavier (more positive) in $\delta^{13}C_1$ while for the same maturity level methane generated by a sapropelic (marine) source is lighter (more negative in $\delta^{13}C_1$) than methane from a humic source.

The δ/maturity function for sapropelic sources is well established. Faber, (1987). The δ/maturity functions for humic (coaly) and mixed sources have been newly established for the present invention, using case histories covering the Northwest-German Upper Carboniferous Basin. Faber, E., Schmitt, M. and Stahl, W. J., 1979 "Geochemische Daten nordwestdeutscher Oberkarbon-, Zechstein- und Buntsandsteingase-migrations-und reifebedingte Änderungen", Erdöl und Kohle-Erdgas-Petrochemie, vol. 32, no. 2, p. 65-70.

It is a unique characteristic of gas reservoired in the Lower Permian or Carboniferous of the Central European Upper Carboniferous Basin that they have been generated from Upper Carboniferous source rock sections of up to 3,000 m thickness with maturities ranging from immature to overmature. This implies that the δ-values of gases cannot simply be related to a discrete maturity level of an underlying source rock. In order to overcome this problem, "effective" maturities have been calculated from the case histories as follows.

Figure 7:
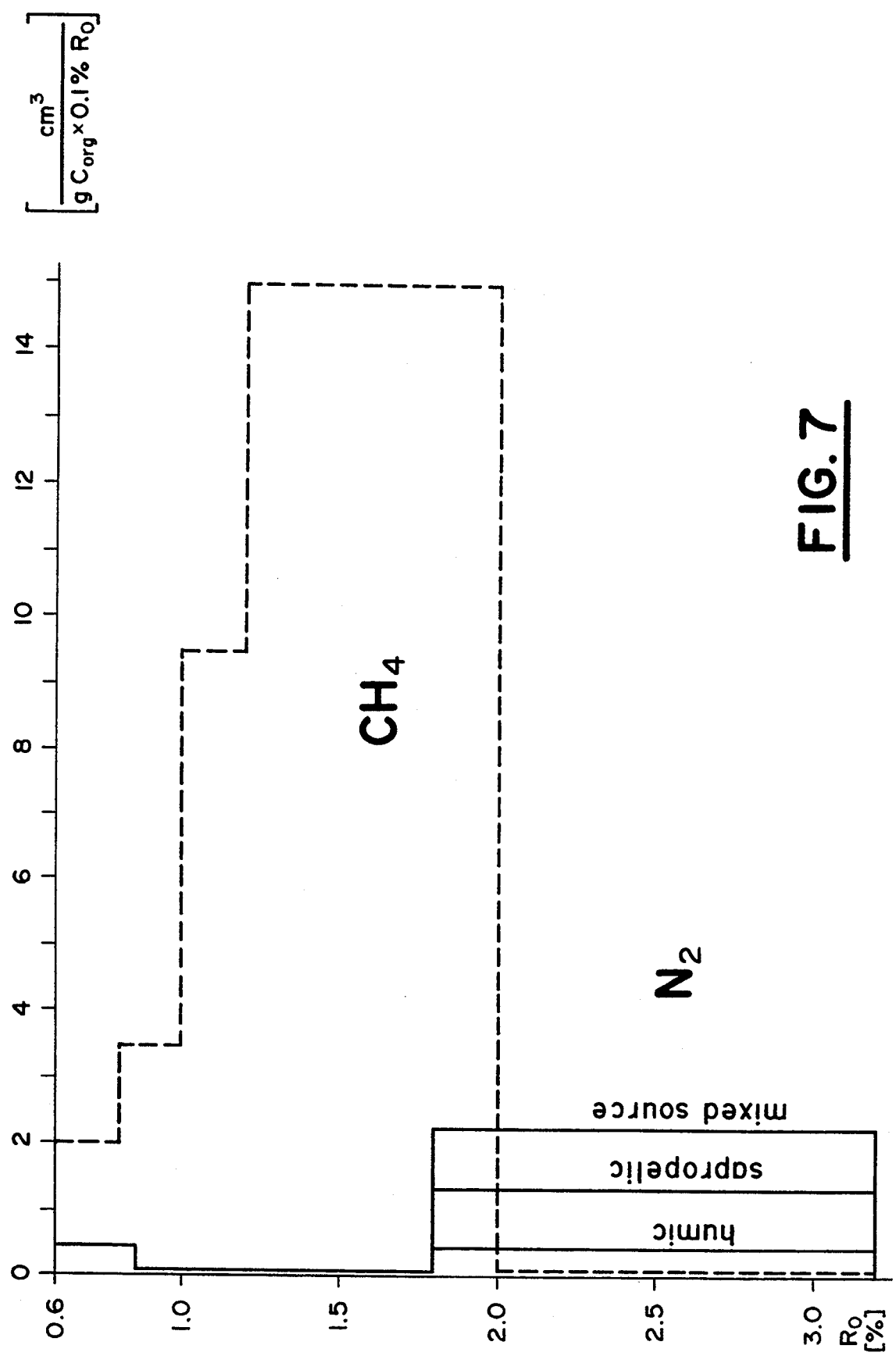
FIG. 7 illustrates differential methane generation for coals.

A model for differential methane generation minus adsorption in the coal with maturity for coaly sources has been earlier established (FIG. 7), essentially based on Juntgen, H. and Klein, J. 1975, "Entstehung von Erdgas aus kohligen Sedimenten", Erdöl and Kohle-Erdgas-Petrochemie, vol. 28, no. 2, p. 65-73; Rohrback, B. G., Peters, K. E. and Kaplan, I. R., 1984, Geochemistry of Artificially Heated Humic and Sapropelic Sediments-part 2 Oil and Gas Generation" AAPG Bull., vol. 68, no. 8, p. 961-970; D. H. Welte, Schaefer, R. G., Stoessinger, G and Radke, M., 1984, "Gas Generation and Migration in the Deep Basin of Western Canada" AAPG Memoir 38, p. 35-47 (for generation); Juntgen, H. and Karweil, J., 1966, "Gasbildung und Gasspeicherung in Steinkohle-flözen" Erdöl and Kohle-Erdgas-Petrochemie, vol. 19, no. 4, p. 251-258, no. 5, p. 339-344; Hewel-Bundermann, H. and Juntgen, H., 1988, "Porengefüge and Wasseraufnahme-kapazität von Steinkohle" Erdöl-rdgas-Kohle, vol. 104, no. 3, p.124–130 (for adsorption). The result is in good agreement with the generation model of Sluijk, D. and M. H. Nederlof, 1984, "Worldwide geological experience as a systematic basis for prospect appraisal" Petroleum Geochemistry and Basin Evaluation, AAPG Memoir 35, p. 15–26 and measurements made by Sackett, W. M., 1978, "Carbon and hydrogen isotope effects during the thermocatalytic production of hydrocarbons in laboratory simulation experiments" Geochimica et Cosmochimica Acta, vol. 42, p. 571–580 and Klein, J. and Löcken, K., 1986, "Einfluss des geothermischen Gradienten auf Inkohlungsrechnungen nach einem reaktionskinetischen Modell" Erdöl-Erdgas-Kohle, vol. 102, no. 4, p. 206–210. This model has then been compared with the natural source rock sections in order to determine which maturity or generation intervals are represented by the source rock section. The mean values of maturity of these intervals represented in nature have been multiplied by factors x, y, z, a, proportional to the differential methane generation within these intervals.

$$x+y+z+a=1 \quad (31)$$

Figure 5:
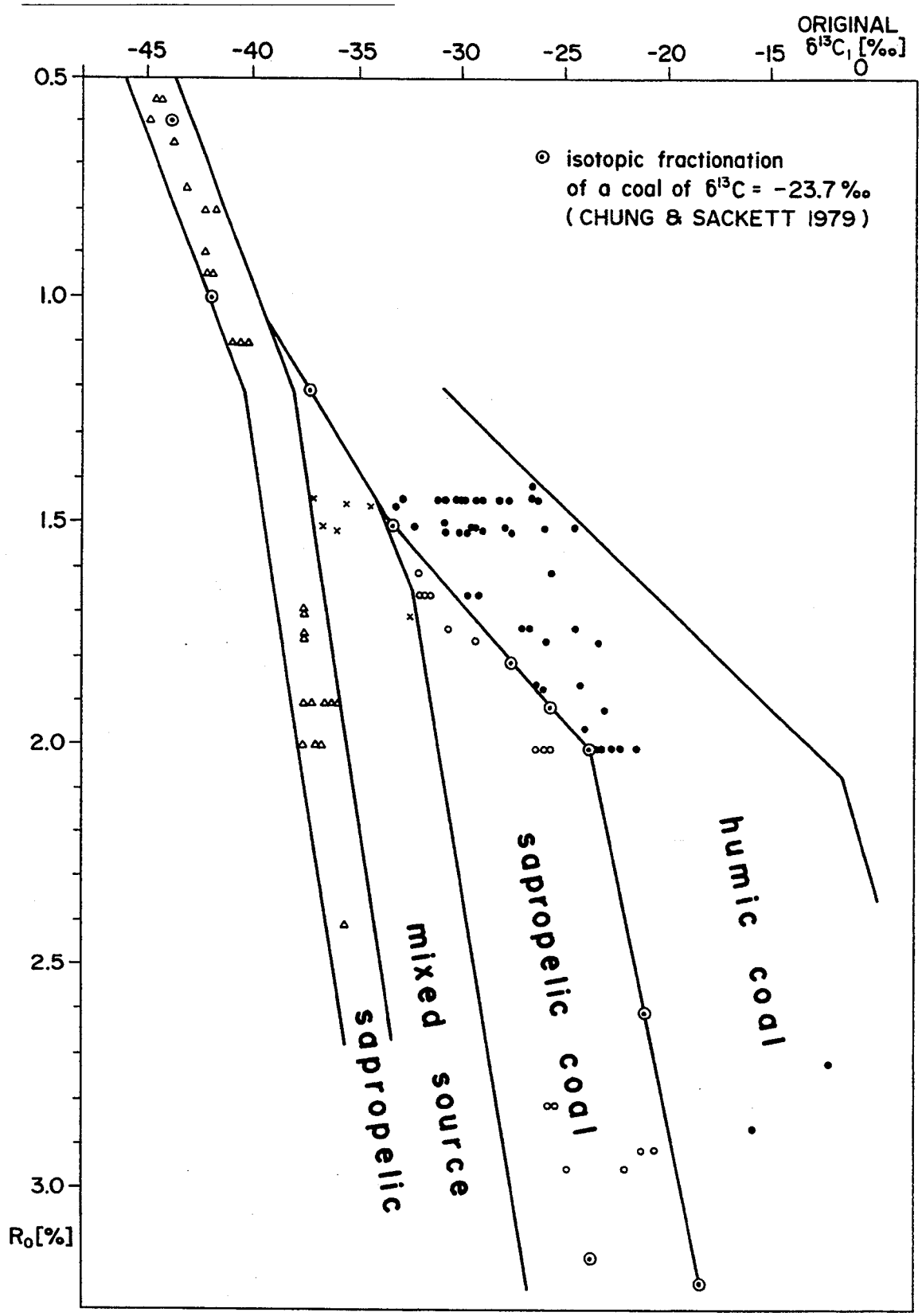
FIG. 5 illustrates the relationship between the $\delta^{13}C_1$ of reservoired methanes with the maturity and organic facies of their source.

The sum of the weightened maturity mean values gives the "effective" maturity, which has been plotted against the $\delta$-values of the reservoired gases in FIG. 5. In order to check this empirical fractionation model during methane generation against laboratory experience, pyrolysis data from Chung and Sackett, 1979 calculated for differential sampling of methane generated from a coal of humic/sapropelic transition type has been plotted in FIG. 5. Redding, C. E., Schoell, M., Monin, J. C. and Durand, B., 1980, "Hydrogen and Carbon isotopic composition of coals and kerogens" Advances in Organic Geochemistry 1979 Douglas, A. G. and Maxwell, J. R Eds., p. 711–723. They coincide apparently with the empirical model.

The general characteristics of the maturity functions illustrated in FIG. 5 make sense since intervals of strong fractionation go along with intervals of strong methane generation. According to that general principle, fractionation decreases at maturities higher than 2% $R_0$.

As shown in FIG. 5, scattering of the data points apparently increases from the sapropelic towards the humic functions. An explanation may be that the case histories used from the Central European Upper Carboniferous Basin comprise both "old" and "young" gas accumulations, sealed effectively by rock salt. The physical process governing gas depletion over time through rock salt is mainly diffusion, where the diffusion velocity is inversely proportional to the atomic weight of the diffusing isotope. Craig, H., Horibe, Y. and Sowers, T., 1988, "Gravitational Separation of Gases and Isotopes in Polar Ice Caps", Science, vol. 242, p. 1675–1678. Therefore relative depletion in the light isotope could be expected to he observed in "old" gases, which means an apparently more positive $\delta$-value for those gases compared with maturity of their source rocks.

Figure 6:
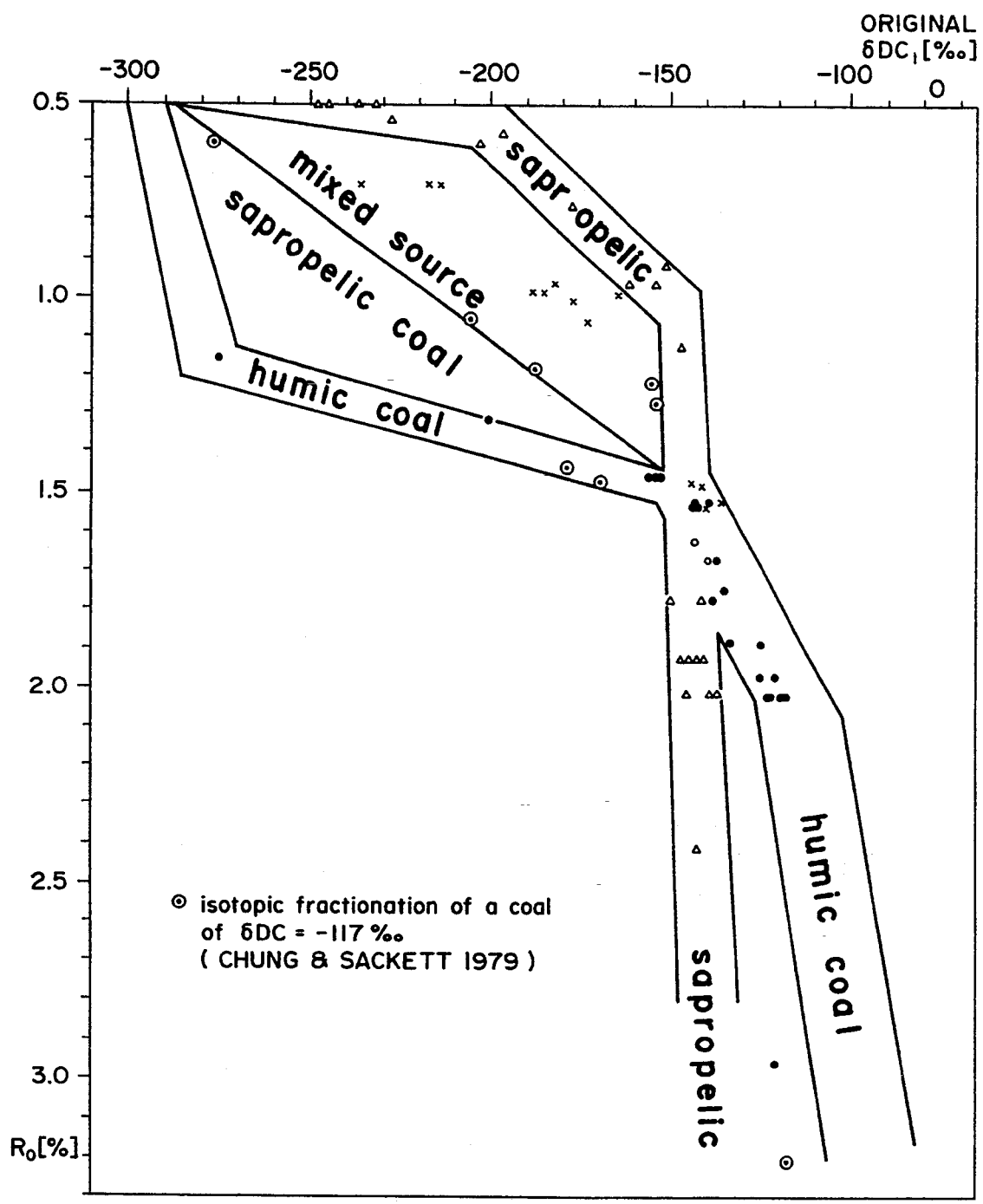
FIG. 6 illustrates the relationship between the $\delta DC_1$ of reservoired methanes with the maturity and organic facies of their source.

From the same case histories, the $\delta DC_1$-values of the reservoired methane are then taken and plotted against the "effective" maturities of the underlying source rock section (FIG. 6). It is evident that the methane generated becomes heavier with increasing maturity and with respect to hydrogen, matching the pyrolysis experiments of both Chung (1976) and Sackett (1978). Within the lower maturity range, $\delta DC_1$ reacts more sensitive to facies changes as within the higher maturity range, and for sapropelic sources becomes even more positive than for humic sources. This different behavior of $\delta DC_1$ relative to $\delta^{13}C_1$ has also been observed by Schoell (1984). For maturities higher than 1.5% $R_0$, fractionation becomes very small.

As has been done for $\delta^{13}C_1$, the $\delta DC_1$-results of the pyrolysis experiment carried out by Chung (1976) and Sackett (1979) and calculated for differential sampling are plotted into FIG. 6 and are found to be in good agreement with the function derived from the case histories.

The numerator in equation 25, except $\lambda$, $\pi$ and $q_{10°\,C}$ stands for the gas potential of a hydrocarbon source (source rock, accumulation) in the subsurface. It can be expressed as:

$$\text{Potential}\left[\frac{cm^3 CH_4}{cm^3 \text{ source rock} \times t}\right] = \frac{\text{delta } G \times TOC \times \Gamma}{t} \quad (32)$$

or $$\text{potential}\left[\frac{m^3 CH_4}{m^2 \text{ surface area} \times t}\right] = \frac{\text{delta } G \times TOC \times \Gamma \times h_1}{t} \quad (33)$$

Normally, gas potentials resulting from the present invention are given as version (33), in order to coincide with the dimension of hydrocarbon potentials normally given by standard software modelling reaction kinetics applied to source rocks.

The parameters t [years] equals the time span gas migration lasts. When the sampled surface sediment is young, then the time available for gas migration into the sediment could become smaller than the total time span of gas migration from the source. In those cases, t has to be taken as the sediment age, which implies that only that part of hydrocarbon migration in the subsurface is recorded, which is covered by the sediment age. It is a general boundary condition in surface geochemical surveys that only this part of the hydrocarbon migration history could be detected which occurred since deposition of the sampled sediment.

Only gas-prone source rocks or gas accumulations can directly be described, using the term "gas potential". In order to describe and quantify oil-prone source rocks or oil accumulations, gas potential has to be transformed into oil potential as follows:

$$\text{Oil potential} = \frac{\text{gas potential} \times 100}{\text{percentage gaseous products of the source [\%]}} - \text{gas potential} \quad (34)$$

It can be concluded from the pre-steady state gas concentration profile shown in FIG. 1 that an isotopical or molecular interpretation of a near-surface gas sample to subsurface hydrocarbon history is only possible when steady state conditions have been reached during transmission of the information to the surface by water convection. Accuracy of interpretation is primarily dependent on the accuracy of quantification of the upward water flux.

Figure 8:
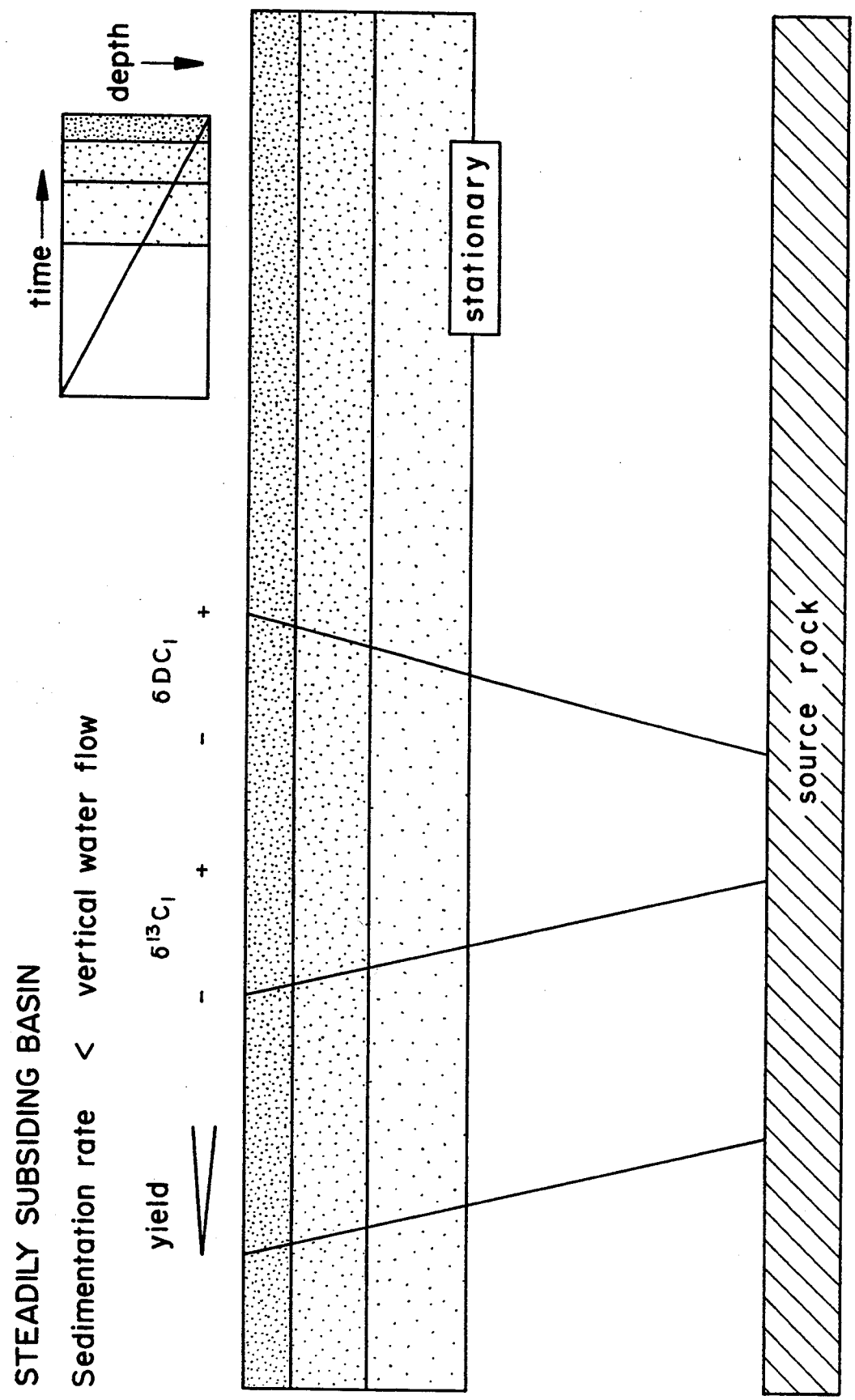
FIG. 8 illustrates general changes in gas parameters during migration in steadily subsiding basins.

Transferring this relationship into different geological conditions of sedimentary basins implies that in a geochemical survey, those surface sediments should exclusively be sampled which have been deposited under the condition of steady subsidence. At least the condition must be fulfilled, that the velocity of the upward water flux exceeds the sedimentation rate (FIG. 8).

Figure 9:
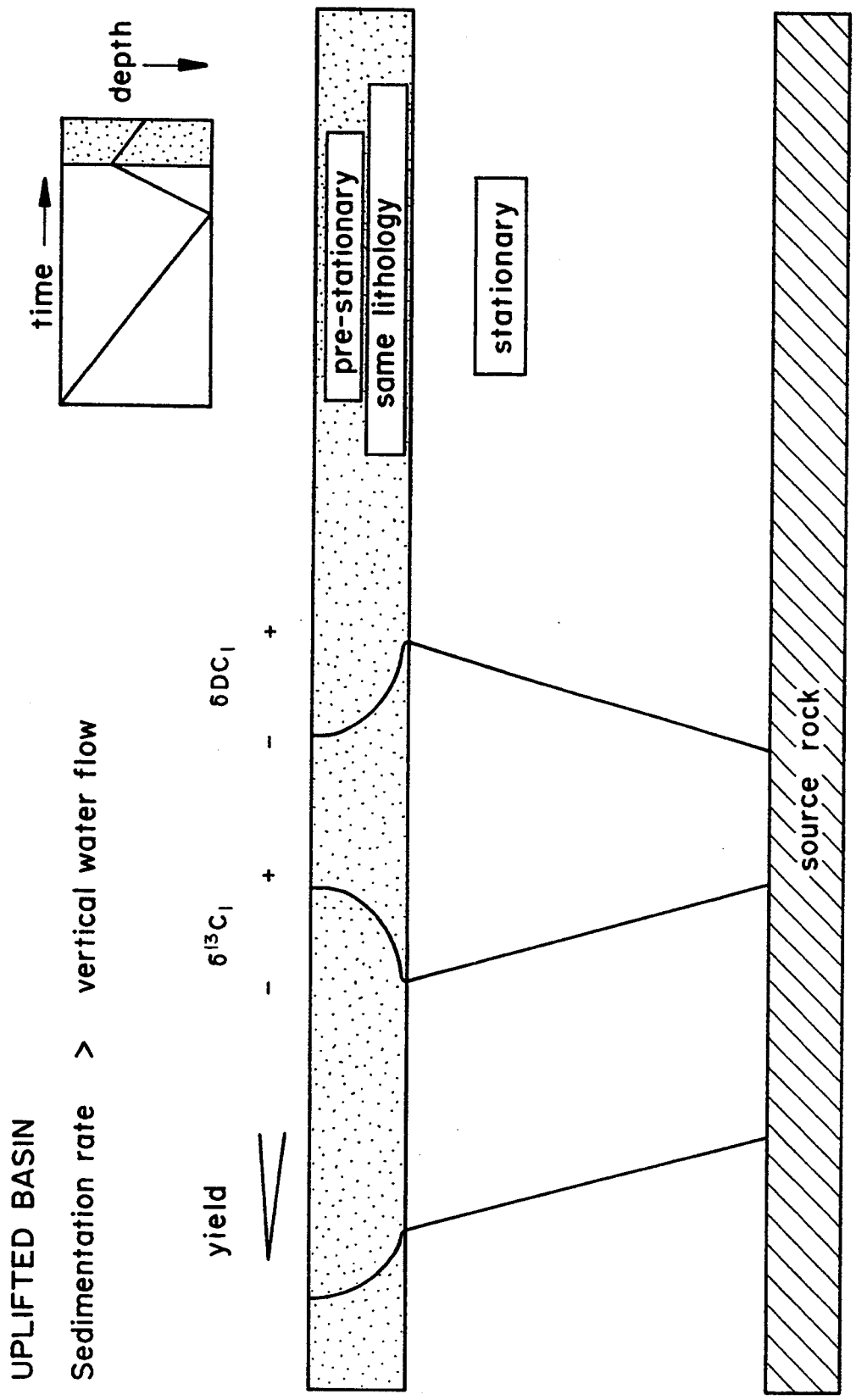
FIG. 9 illustrates general changes in gas parameters during migration in upshifted basins.

It sometimes occurs that a sedimentary basin will undergo recent uplift or inversion, which implies a reduced upward water flux. In those cases, young sediments deposited during uplift e.g. glacial drift sediments, commonly reveal either no or a prestationary gas concentration profile (FIG. 9). For a geochemical survey under the condition of basinal uplift, it is recommended to sample older sediments deposited during a period of steady subsidence where exposed to the surface.

The latter procedure additionally offers the opportunity to detect hydrocarbon accumulations directly from surface information due to the following reason. It has to be assumed that the product gas potential multiplied by migration time over an accumulation site is markedly higher than away from the accumulation, since in the latter case, migration time is short because gas expulsion from the source rock has ceased with the beginning of uplift, whereas gas migration from a once existing accumulation towards the surface continues until the present. Such an "old" accumulation should be seen at the surface especially in these geological settings by higher gas potentials over time.

One factor which can disrupt the present method is the near-surface process of bacterial oxidation of methane and higher hydrocarbons. Theoretically, bacterial oxidation produces in a first instance bacterially produced methane which fills the free pore space of a sediment. The method presented here excludes this process, because only the adsorbed gas phase is analyzed. Nevertheless, bacterial oxidation is sometimes observed affecting adsorbed gas. The most important factor governing bacterial oxidation is a high oxygen supply. This can be given by sampling above the ground water table, or by sampling red bed sediments rich in an organic oxygen. Therefore, samples should be taken from reducing environments. Red bed sediments often require a sampling at deeper levels.

Bacterial oxidation can be detected by the following characteristics for the adsorbed gas phase:
1. More positive $\delta^{13}C_1$ (approximately $-20$ to $-30$ 0/00), more negative $\delta DC_1$.
2. High content of unsaturated compounds (ethene) relative to methane, which characterizes bacterial oxidation as a very rapid process.
3. Relatively high $C_{2+}$ contribution to the gas, because bacterial degradation attacks methane at first.
4. The degree of bacterial oxidation correlates strictly to the sand content $>63$ $\mu m / <63$ $\mu m$ of the bulk sample.

Diagnostic for the interpretation procedure are:
1. condition: wetness of gas is higher compared to that normal for the source rock.
2. condition: the relationship methane yield/ethene yield is smaller than approximately 200.

Both conditions have to be fulfilled.

Abiogenic background gases look very similar to oxidized gases, both in isotopic and in molecular characteristics. Nevertheless, they can be distinguished from oxidized gases by the following criterium. For each survey, threshold values for methane and ethene could be established. Values exceeding the threshold are indicative for bacterial oxidation, values remaining below the threshold are indicative for background gas.

Another type of interference to the molecular and isotopic composition of adsorbed gases can be caused by artificial gases, produced while drilling. Faber, E. Gerling, P., Dumke, J., 1988, "Gaseous hydrocarbons of unknown origin found while drilling", Organic Geochemistry, vol. 13, nos. 4–6, p. 875–879. Artificial gases are produced by precursors of bit metamorphism, which could take place during rotary drilling of hardrocks or even during ram hammer coring of course sands and gravels. Interference by artificial gases reveals the following features.

Initially, unsaturated hydrocarbons are formed (high ethene content) and the isotopic composition is changed. $\delta DC_1$ then becomes extremely negative (more than $-300$ 0/00). $\delta^{13}C_1$ becomes more positive and falls within the range of bacterial oxidation or background. During an advanced state of artificial gas generation, even saturated hydrocarbons can be produced.

For onshore softrock sampling, continuous cores may be obtained using a motor-driven ram hammer device. For hardrock sampling, cuttings may be taken from rotary drilling with pure water mud. In order to avoid bacterial oxidation, samples may be taken below the local ground water table. Offshore sampling can be carried out by gravity coring.

The sample will be frozen in liquid nitrogen in order to avoid secondary alteration during transport. If a new sediment is sampled, a parallel sample from the same sediment will be taken in order to determine in-situ permeability K.

For sample preparation, the coarse fraction $>63$ $\mu m$ of the bulk sediment will be seaved out. From the remaining fine fraction $<63$ $\mu m$ the adsorbed gas will be extracted via acid treatment. Molecular composition and yields are determined by low-temperature gas chromatography. Results are given as weight-ppbs gas per fine fraction $<63$ $\mu m$ of the sample. The gas components relevant for the determination of the $^{13}C/^{12}C$ or D/H compositions are separated from the carrier gas flux.

Analysis of the stable isotope compositions $^{13}C/^{12}C$ and D/H is carried out by mass spectrometry suitable for measuring very small gas vol.umes. Calibration of the device is made against the PDB ($\delta^{13}C_1$) or SMOW ($\delta DC_1$) standards The procedure according to the present invention will now be described by the following method and example.

For different values of geological factor A, data pairs $x_{sn}/F_{13C1}$ and $x_{sn}/F_{DC1}$ are calculated and shown graphically (FIGS. 2 and 3).

Clayey samples are taken below the zone of near surface oxidation. If onshore, by use of a motor-driven ram hammer, while if offshore by the use of a gravity-coring device. For onshore sampling this means from depths below the ground water table. Sampling red bed sediments normally requires greater depths in order to avoid bacterial oxidation. Approximately 300 to 500 g of the sample will be taken for the extraction of the adsorbed gases, the same quantity for measuring petrophysical parameters.

The part of the sample destinated to degassing is frozen in liquid nitrogen at $-196°$ Celsius in order to avoid secondary alteration during transport. To eliminate gases produced in situ by bacterial fermentation as well as free thermocatalytic gases, the gas within the free pore space is removed by separating the coarse sediment fraction $>63$ $\mu m$ by means of seaving, washing and centrifugating. The fine fraction <63 μm is then determined by weight. The gases adsorbed at this fine fraction are extracted by acid treatment under vacuum conditions. Gas yields and molecular compositions are determined using low-temperature gas chromatography. Gas composition are given as % of the gaseous hydrocarbons methane through hexane, gas yield is given as g gas per g fine sediment fraction in ppb.

Analysis of the stable isotopes $^{12}C/^{13}C$ and D/H for methane will be carried out by the use of mass spectrometry suitable for measuring gas vol.umes as small as 1 μl $CO_2$ and 200 μl $H_2$ under normal conditions. The isotopic ratios will be calibrated for carbon against the PDB-standard, for hydrogen against the SMOW-standard.

Porosity Φ and permeability K of the bulk sample will be determined in a laboratory set-up at three different densities, in order to approach the original sediment density.

T is the average temperature at the sample depth, adsorptivity $q_{10°\ C.}$ of methane at clay as well as the dynamic viscosity μ of water as a function of T are known.

Planning of a survey and sample acquisition requires that the near-surface sediment sampled reveals a gas concentration profile which is the result of a stationary upward water flux. Transferred into geological terms, this means that for the whole sedimentary section between the hydrocarbon source and the surface upward water flow must be greater than the sedimentation rate. Generally, this condition is fulfilled only in steadily subsiding basins, but not in basins which have undergone recent uplift and are covered by glacial drift sediments. It is a generally boundary condition that sediments of a deposition age must be sampled in a manner in which the above mentioned condition is fulfilled, wherever they are exposed to the surface.

A graph is first established having semilogarithmic scaling, which compares the relationship between A, $x_{sn}$ and F and in a manner as illustrated in FIGS. 2 and 3. A second graph is then established having as the horizontal axis $x_{sn}$ while on the vertical axis the measured isotopic ratios $\delta^{13}C_1$ or $\delta DC_1$ respectively from the sample are plotted (instead of F=delta $\delta^{13}C_1$ or delta $\delta DC_1$ and choosing the same scale for −1 0/00 or +20 0/00 respectively as for F). See the subgraph, FIG. 10 in FIG. 2. An interval chosen on the vertical axis cover must be established to cover the range of the measured δ-values (−44 0/00 through −47 0/00 in example FIG. 10).

Measured data pairs $x_{sn}/\delta^{13}C_1$ and $x_{sn}/DC_1$ from the same survey are to be plotted on this second graph (FIG. 10), under the requirement that they each refer to the same hydrocarbon source, and that they each are taken from a sediment with the same petrophysical properties. The resultant regression line of the data points on the graph shows a linear function on the semilogarithmic scale.

Thus, the graph of data points established is placed on top of the comparative graph of FIG. 2, fitted to its horizontal axis and shifted strictly along the vertical axis until the gradient of the data regression line matches a gradient of the set of continuous linear functions on the comparative graph, FIG. 2 calculated for different values of A. Factor A, identified by this procedure, is 0.3 according to FIG. 2 and is valid for the measured data points.

Once factor A has been graphically determined, the gas potential in the subsurface at the site of the sample can then be calculated according to the following equation, which is obtained by transforming equation 25 into:

$$\text{gas potential} = \frac{A \times \sqrt{T} \left[ \Phi \times h_2) + \left( \frac{i \times (\sqrt{(K_0^2 + K^2)} - K_0) \times 3.1 \times 10^2 \times t}{\mu} \right) \right]}{\cap \times \pi \times q_{10°\ C.}} \quad (35)$$

where additionally migration distance $h_2$ between the hydrocarbon source and the surface sample and the local vertical excess pressure gradient i are included, and a geological time interval t [years] is referred to and where μ as a function of T and $q_{10°\ C.}$ are known.

For the same organic facies and for small maturity increments, the respective values for the original $\delta^{13}C_{10}$ from FIG. 5 and the original $\delta DC_{10}$ from FIG. 6 will be plotted on a graph FIG. 4 with the scaling of $\delta^{13}C_1$ and $\delta DC_1$ along the axis. This results in a spur which is subdivided by maturity increments. The procedure will be repeated for the other organic facies types, and the maturity marks along the spurs are connected.

Installing the previously established fractionation factors $_{13C1/12C1}=1.0014493$ and $_{DC1/HC1}=0.9752528$ into equation 16, the isotopic shifts $F_{13C1}$ and $F_{DC1}$ will be calculated for different values of A and for the methane yield $x_{sn}$. Pairs $F_{13C1/DC1}$ for discrete values of A and $x_{sn}$ are plotted into the diagram starting from the different pairs of original isotopic ratios $\delta^{13}C_{10}/\delta DC_{10}$ for different facies and maturities, and are connected to the starting points by straight lines. The result is a parallel set of straight lines because the relationship between both F values remains constant for different values of A and $x_{sn}$. The value of F, which means the degree of isotopic fractionation starting from an original isotopic ratio, exclusively depends on A and $x_{sn}$ (see equation 16). This implies for the use of the diagram that a discrete distance along the parallel lines reflects a discrete combination of A and $x_{sn}$, which is shown in the subgraph FIG. 11 of FIG. 4.

A measured data pair $\delta^{13}C_1/\delta DC_1$ will then be plotted into FIG. 4, which results in a point X. X is situated on a discrete line of the parallel set. This line meets the spurs of the original δ-pairs possible in nature and the spurs of the four different organic facies types at four points M, S, G and H, additionally situated at different points within the field of iso-maturity lines.

This results in four different source rock options for the measured data pair X. M=sapropelic source with a maturity of 1.0%, S=mixed source with a maturity of 1.06%, G=sapropelic coal with a maturity of 1.18% and H=humic coal with a maturity of 1.18%.

In order to discriminate one option out of these four, the distance must be determined over which the isotopic fractionation must be shifted back along the straight lines starting from point X. This distance is determined from the values for factor A and yield $x_{sn}$ according to subgraph FIG. 11 of FIG. 4. Factor A may be A=0.01 and the methane yield $x_{sn}$=2000 ppb. This leads to point U in the subgraph FIG. 11 with a distance from the starting point of 3.4 cm.

By this amount of distance, data point x will be "shifted back" along the straight line and in a direction to the facies spurs. Point S will then be reached, and is the source rock responsible for the measure data pair X characterized as a mixed source type with a maturity of $R_0=1.06\%$.

The gas/oil ratio of hydrocarbons generated by source rocks of different organic facies and maturities can thus be estimated using known relationships based on previous characterization of the source rock.

This gas/oil ration will be transformed into "percentage of gaseous products of the source" [%] and installed into equation 34. By installing the gas potential as earlier calculated in equation 35, the oil potential of the subsurface at the same site can be determined.

I claim:

1. A method for determining the potential and character of a hydrocarbon source within the subsurface of a sedimentary basin through analysis of methane gas traces in one of near surface sediments and seabeds comprising the steps of:
    a) collecting multiple sediment samples from beneath the zone of near surface oxidation in a region of a selected sedimentary basin;
    b) measuring a permeability of each collected sample to verify uniform waterflux (waterflow/time) through the region of the selected basin to be evaluated;
    c) analyzing each collected sample to determine the adsorbed methane gas yield $x_{sn}$ for each sample;
    d) analyzing the adsorbed methane gas in each collected sample to determine the isotopic ratio of methane containing the $C^{13}$ isotope to methane containing the $C^{12}$ isotope ($\delta^{13}C_1$) or the isotopic ratio of methane containing the D isotope to methane containing the H isotope ($\delta DC_1$);
    e) correlating from the methane gas yields $x_{sn}$ and the isotopic ratios the degree of isotopic shift F for each of the collected samples;
    f) determining the original isotopic ratios at the hydrocarbon source by subtracting the isotopic shift F from the measured isotopic ratios in each of the collected samples;
    g) deriving the methane gas potential within the selected region of the basin from the degree of isotopic shift F, waterflux through the sediment over time (age of the sampled sediment), fractionation factors $\alpha$ for $\delta^{13}C_1$ or $\delta DC_1$ respectively and the methane yield $x_{sn}$ of each of the samples whereby hydrocarbon anomalies within the selected region of the basin can be identified; and
    h) extrapolating from the original isotopic ratios the overall maturity and organic facies of the hydrocarbon source within the subsurface of the selected region of the basin.

2. A method for determining the potential and character of a hydrocarbon source within the subsurface of a sedimentary basin through analysis of methane gas traces in one of near surface sediments and seabeds comprising the steps of:
    a) collecting multiple sediment samples from beneath the zone of near surface oxidation in a region of a selected sedimentary basin;
    b) measuring a permeability of each collected sample to verify uniform waterflux (waterflow/time) through the region of the selected basin to be evaluated;
    c) separating the coarse sediment fraction $>63$ $\mu$m from the fine sediment fraction $<63$ $\mu$m of each of the collected samples;
    d) weighing the fine fractions;
    e) extracting the gases adsorbed in the fine fractions;
    f) analyzing the extracted methane gas of each collected sample through low temperature gas chromatography to determine the adsorbed methane gas yield $x_{sn}$ for each sample;
    g) analyzing the adsorbed methane gas in each collected sample to determine the isotopic ratio of methane containing the $C^{13}$ isotope to methane containing the $C^{12}$ isotope ($\delta^{13}C_1$) or the isotopic ratio of methane containing the D isotope to methane containing the H isotope ($\delta DC_1$);
    h) correlating from the methane gas yields $x_{sn}$ and the isotopic ratios the degree of isotopic shift F for each of the collected samples;
    i) determining the original isotopic ratios at the hydrocarbon source by subtracting the isotopic shift F from the measured isotopic ratios in each of the collected samples;
    j) deriving the methane gas potential within the selected region of the basin from the degree of isotopic shift F, waterflux through the sediment over time (age of the sampled sediment), fractionation factors $\alpha$ for $\delta^{13}C_1$ or $\delta DC_1$ respectively and the methane yield $x_{sn}$ of each of the samples whereby hydrocarbon anomalies within the selected region of the basin can be identified; and
    k) extrapolating from the original isotopic ratios the overall maturity and organic facies of the hydrocarbon source within the subsurface of the selected region of the basin.

3. A method for determining the potential and character of a hydrocarbon source within the subsurface of a sedimentary basin through analysis of methane gas traces in one near surface sediments and seabeds comprising the steps of:
    a) collecting multiple sediment samples from beneath the zone of near surface oxidation in a region of a selected sedimentary basin;
    b) measuring a permeability of each collected sample to verify uniform waterflux (waterflow/time) through the region of the selected basin to be evaluated;
    c) analyzing each collected sample to determine the adsorbed methane gas yield $x_{sn}$ for each sample;
    d) analyzing the adsorbed methane gas in each collected sample to determine the isotopic ratio of methane containing the $C^{13}$ isotope to methane containing the $C^{12}$ isotope ($\delta^{13}C_1$) or the isotopic ratio of methane containing the D isotope to methane containing the H isotope ($\delta DC_1$);
    e) correlating from the methane gas yields $x_{sn}$ and the isotopic ratios the degree of isotopic shift F for each of the collected samples; and
    f) deriving the methane gas potential within the selected region of the basin from the degree of isotopic shift F, waterflux through the sediment over time (age of the sampled sediment), fractionation factors $\alpha$ for $\delta^{13}C_1$ or $\delta DC_1$ respectively and the methane yield $x_{sn}$ of each of the samples whereby hydrocarbon anomalies within the selected region of the basin can be identified and where the fractionation factors $\alpha$ between $^{13}C$ and $^{12}C$ or between D and H are expressed by the following equation:

$$\ln x_{sn} = \frac{\ln\left(\frac{1+A}{A}\right)}{\ln\left(\frac{1+A}{\alpha+A}\right)} \times \ln\left(\frac{F+1000}{1000}\right)$$

$$[\ln(1+A) - \ln(\alpha + A)]\ln x_{sn} =$$

$$-\ln\left(\frac{1+A}{A}\right) \times \ln\left(\frac{F+1000}{1000}\right)$$

$$\ln x_{sn} \times \ln(\alpha + A) = \ln\left(\frac{1+A}{A}\right) \times$$

$$\ln\left(\frac{F+1000}{1000}\right) + \ln x_{sn} \times \ln(1+A)$$

$$\ln(\alpha + A) = \frac{1}{\ln x_{sn}} \times \ln\left(\frac{1+A}{A}\right) \times$$

$$\ln\left(\frac{F+1000}{1000}\right) + \ln(1+A)$$

$$\frac{\ln\frac{F+1000}{1000}}{\ln x_{sn}}$$

$$\alpha + A = (1+A)\left(\frac{1+A}{A}\right)^{\frac{\ln\frac{F+1000}{1000}}{\ln x_{sn}}}$$

$$\alpha = -A + (1+A)\left[\left(\frac{1+A}{A}\right)\right]$$

where $x_{sn}$ is the concentration of the adsorbed methane gas, F is the difference between the isotopic composition $\delta^{13}C_1$ measured at the surface and the original $\delta^{13}C_{10}$ characterizing the hydrocarbon source or the difference between the isotopic composition $\delta DC_1$ measured at the surface and the original $\delta DC_{10}$ characterizing the hydrocarbon source respectively, and A equals the relationship of the lighter isotope $^{12}C$ or H respectively in the adsorbed phase to that in the dissolved phase and is a factor the function of which depends on purely geological parameters of the sampled sedimentary basin region, according to the equation:

$$A = \frac{\cap \times \pi \times q_{10°C} \times \text{delta } G \times TOC \times h_1 \times \Gamma \times 10 \text{ delta } R_0}{\sqrt{T}\left[(\Phi \times h_2) + \left(\frac{i \times (\sqrt{(K_0^2 + K^2)} - K_0) \times 3.1 \times 10^2 \times t}{\mu}\right)\right]}$$

where
delta G = differential gas generation (cm³/g TOC×0.1% $R_0$)
TOC = organic carbon content (%)
$\Gamma$ = source rock density (g/cm³)
h1 = source rock thickness (m)
delta $R_0$ = maturity increment during time t (%)

q10° C. = adsorptivity methane/clay at 10° C. temperature (cm³/cm³)
$\cap$ = solubility methane in water under surface conditions (cm³/cm³)
$\mu$ = dynamic viscosity of water at temperature T (cp)
K = permeability of the sample (Darcy)
$\Phi$ = effective porosity of the sample (%)
t = time available to the gas migration (years)
h2 = migration distance of the gas (m)
T = sample temperature (° Celsius)
$K_0$ = threshold value of K for the transition non-linearity/linearity of Darcy's law
i = upwards directed excess pressure gradient (bar/m) over time t.

4. A method for determining the potential and character of a hydrocarbon source within the subsurface of a sedimentary basin through analysis of methane gas traces in one of near surface sediments seabeds comprising the steps of:

a) collecting multiple sediment samples from beneath the zone of near surface oxidation in a region of a selected sedimentary basin;

b) measuring a permeability of each collected sample to verify uniform waterflux (waterflow/time) through the region of the selected basin to be evaluated;

c) analyzing each collected sample to determine the adsorbed methane gas yield $x_{sn}$ for each sample;

d) analyzing the adsorbed methane gas in each collected sample to determine the isotopic ratio of methane containing the $C^{13}$ isotope to methane containing the $C^{12}$ isotope ($\delta^{13}C_1$) or the isotopic ratio of methane containing the D isotope to methane containing the H isotope ($\delta DC_1$);

e) correlating from the methane gas yields $x_{sn}$ and the isotopic ratios the degree of isotopic shift F for each of the collected samples;

f) deriving the methane gas potential within the selected region of the basin from the degree of isotopic shift F, waterflux through the sediment over time (age of the sampled sediment), fractionation factors $\alpha$ for $\delta^{13}C_1$ or $\delta DC_1$ respectively and the methane yield $x_{sn}$ of each of the samples whereby hydrocarbon anomalies within the selected region of the basin can be identified and where the fractionation factors $\alpha$ between 13C and $^{12}$C or between D and H are expressed by the following equation:

$$\ln x_{sn} = \frac{\ln\left(\frac{1+A}{A}\right)}{\ln\left(\frac{1+A}{\alpha+A}\right)} \times \ln\left(\frac{F+1000}{1000}\right)$$

$$[\ln(1+A) - \ln(\alpha + A)]\ln x_{sn} =$$

$$-\ln\left(\frac{1+A}{A}\right) \times \ln\left(\frac{F+1000}{1000}\right)$$

$$\ln x_{sn} \times \ln(\alpha + A) = \ln\left(\frac{1+A}{A}\right) \times$$

$$\ln\left(\frac{F+1000}{1000}\right) + \ln x_{sn} \times \ln(1+A)$$

$$\ln(\alpha + A) = \frac{1}{\ln x_{sn}} \times \ln\left(\frac{1+A}{A}\right) \times$$

$$\ln\left(\frac{F+1000}{1000}\right) + \ln(1+A)$$

$$\frac{\ln\frac{F+1000}{1000}}{\ln x_{sn}}$$

$$\alpha + A = (1+A)\left(\frac{1+A}{A}\right)$$

$$\frac{\ln\frac{F+1000}{1000}}{\ln x_{sn}}$$

$$\alpha = -A + (1+A)\left[\left(\frac{1+A}{A}\right)\right]$$

where xm is the concentration of the adsorbed methane gas, F is the difference between the isotopic composition $\delta^{13}C_1$ measured at the surface and the original $\delta^{13}C_{10}$ characterizing the hydrocarbon source, or the difference between the isotopic composition $\delta DC_1$ measured at the surface and the original $\delta DC_{10}$ characterizing the hydrocarbon source respectively, and A equals the relationship of the lighter isotope $^{12}C$ or H respectively in the adsorbed phase to that in the dissolved phase and is a factor the function of which depends on purely geological parameters of the sampled sedimentary basin region, according to the equation:

$$A = \frac{\cap \times \pi \times q_{10° C.} \times \text{delta } G \times TOC \times h_1 \times \Gamma \times 10 \text{ delta } R_0}{\sqrt{T}\left[(\Phi \times h_2) + \left(\frac{i \times (\sqrt{(K_0^2 + K^2)} - K_0) \times 3.1 \times 10^2 \times t}{\mu}\right)\right]}$$

where delta G = differential gas generation ($cm^3$/g TOC×0.1% $R_0$)
TOC = organic carbon content (%)
$\Gamma$ = source rock density (g/$cm^3$)
h = source rock thickness (m)
delta $R_0$ = maturity increment during time t (%)

$q_{10° C.}$ = adsorptivity methane/clay at 10° C. temperature ($cm^3$/$cm^3$)
$\cap$ = solubility methane in water under surface conditions ($cm^3$/$cm^3$)
$\mu$ = dynamic viscosity of water at temperature T (cp)
K = permeability of the sample (Darcy)
$\Phi$ = effective porosity of the sample (%)
t = time available to the gas migration (years)
$h_2$ = migration distance of the gas (m)
T = sample temperature (° Celsius)
$K_0$ = threshold value of K for the transition non-linearity/linearity of Darcy's law
i = upwards directed excess pressure gradient (bar/m) over time t;

g) calculating data pairs $x_{sn}$/F for $\delta^{13}C_1$ or $\delta DC_1$ for the different values of A according to the equation:

$$x_{sn} = \exp - \left[\frac{\ln\left(\frac{1+A}{A}\right)}{\ln\left(\frac{1+A}{\alpha+A}\right)} \times \ln\left(\frac{F+1000}{1000}\right)\right]$$

and graphically expressing the results as a series of regression lines, whereby each of the regression lines has a gradient representative of a given value for A;

h) plotting the measured data pairs of $x_{sn}/\delta^{13}C_1$ or $x_{sn}/\delta DC_1$ for the sampled gases on a semilogrithmic scale (log $x_{sn}$ versus $\delta^{13}C_1$ or $\delta DC_1$) to express a linear function having a gradient and matching the plotted data pairs to a gradient representative of a given value A thereby determining factor A for the sampled region;

i) calculating the methane gas potential within the sampled basin according to the following equation:

$$\text{gas potential} = \frac{A \times \sqrt{T}\left[\Phi \times h_2) + \left(\frac{i \times (\sqrt{(K_0^2 + K^2)} - K_0) \times 3.1 \times 10^2 \times t}{\mu}\right)\right]}{\cap \times \pi \times q_{10° C.}}$$

where $\mu$ as a function of T is known and $q_{10° C.}$ is known; and j) calculating the oil potential of the selected region from the methane gas potential according to the following equation:

$$\text{Oil potential} = \frac{\text{methane gas potential} \times 100}{\text{percentage gaseous products of the source [\%]}} - \text{gas potential}.$$

* * * * *